United States Patent
Park et al.

(10) Patent No.: US 6,785,701 B2
(45) Date of Patent: Aug. 31, 2004

(54) APPARATUS AND METHOD OF PERFORMING ADDITION AND ROUNDING OPERATION IN PARALLEL FOR FLOATING-POINT ARITHMETIC LOGICAL UNIT

(75) Inventors: Woo Chan Park, Seoul (KR); Tack Don Han, Seoul (KR)

(73) Assignee: Yonsei University, Seoul (KR)

( * ) Notice: Subject to any disclaimer, the term of this patent is extended or adjusted under 35 U.S.C. 154(b) by 533 days.

(21) Appl. No.: 09/841,708

(22) Filed: Apr. 23, 2001

(65) Prior Publication Data

US 2002/0129075 A1 Sep. 12, 2002

(30) Foreign Application Priority Data

Jan. 26, 2001 (KR) .......................................... P2001-3782

(51) Int. Cl.[7] ................................................ G06F 7/38
(52) U.S. Cl. ...................................... 708/505; 708/204
(58) Field of Search ................................ 708/204, 205, 708/495, 505

(56) References Cited

U.S. PATENT DOCUMENTS

| | | | | |
|---|---|---|---|---|
| 5,303,174 A | * | 4/1994 | Okamoto ..................... | 708/505 |
| 5,568,412 A | | 10/1996 | Han et al. | |
| 6,148,316 A | * | 11/2000 | Herbert et al. .............. | 708/505 |
| 6,282,554 B1 | * | 8/2001 | Abdallah et al. ........... | 708/204 |

OTHER PUBLICATIONS

Beaumont–Smith et al., "Reduced Latency IEEE Floating–Point Standard Adder Architectures", IEEE, 1999, pp. 35–42.
Park et al., Efficient Simutaneous Rounding Method Removing Sticky–Bit for Critical Path for Floating Point Addition, IEEE, 2000, pp. 223–226.
Park et al., "Floating Point Adder/Subtractor Performing IEEE Rounding and Addition/Subtraction in Parallel", IEICE Trans. Inf. & Syst., vol. E79–D, No. 4, Apr. 1996, pp. 297–305.

* cited by examiner

Primary Examiner—Chuong Dinh Ngo
(74) Attorney, Agent, or Firm—Sheridan Ross PC

(57) ABSTRACT

A floating-point ALU that performs an IEEE rounding and an addition in parallel in a simultaneous rounding method (SRM) type floating-point adder. The floating-point ALU includes an alignment/normalization section for bypassing or inverting a first fraction part and a second fraction part, performing an alignment by performing a right shift as much as a value obtained from an exponent part or performing a normalization through a left shift by calculating a leading zero with respect to the first fraction part, and obtaining a guard bit (G), round bit (R), and sticky bit (Sy); and an addition and rounding operation section for performing a addition and rounding with respect to the first fraction part and second fraction part outputted through the alignment/normalization section. According to the floating-point ALU, the processing time and the hardware size can be reduced, and the hardware of the SRM can be used as it is.

8 Claims, 5 Drawing Sheets

APPARATUS AND METHOD OF PERFORMING ADDITION AND ROUNDING OPERATION IN PARALLEL FOR FLOATING-POINT ARITHMETIC LOGICAL UNIT

BACKGROUND OF THE INVENTION

1. Field of the Invention

The present invention relates to a floating-point operator, and more particularly to an apparatus and method of performing conversion and IEEE rounding in parallel for a floating-point arithmetic logical unit (ALU) using a simultaneous rounding method (SRM).

2. Description of the Related Art

Generally, a floating-point operator is essentially used in a graphic accelerator, digital signal processor (DSP), and a computer requiring a high performance, and most floating-point operators are provided with floating-point adders, multipliers, dividers, and square-root extractors.

Since the operation using the floating-point adder is given the most weight in the floating-point operator, the floating-point adder holds the most important part of the floating-point operator, and has a great effect upon the whole floating-point operation.

The floating-point ALU operation includes a comparison, conversion, round, and other simple logical operations in addition to the addition/subtraction performed in the floating-point adder, and these operations are implemented by adding separate hardware to the floating-point adder.

Especially, a conversion and round (CR) operation that includes two conversion operations and around operation has the most complicated processing structure in the ALU operation, and has difficulty in implementation.

With reference to the publication of IEEE Std 754-1985, "IEEE standard for binary floating-point arithmetic," IEEE, 1985, the CR operation briefly divided into conversion (ftoi) of a floating-point number to an integer type number, conversion (itof) of an integer type number to a floating-point number, and round operation (rnd) of a floating-point number.

As explained in D. Goldberg, "Computer arithmetic," Appendix A of J. L. Hennessy, and D. A. Patterson, Computer architecture: a quantitative approach, MorganKaufmann Publishers Inc, 1996., the fractional process in the floating-point addition is composed of a first stage of alignment, second stage of addition, third state of normalization, and fourth stage of rounding.

Recently, various results of research for high-speed floating-point addition have been announced. They are [1] W. C. Park, S. W. Lee, O. Y. Kown, T. D. Han, and S. D. Kim, "Floating-point adder/subractor performing IEEE rounding and addition and addition/subtraction in parallel," IEICE Trans. Information and Systems, vol. E79-d, no. 4, pp. 297–305, April 1996.; [2] W. C. Park, T. D. Han, S. D. Kim, efficient simultaneous rounding method removing sticky-bit from critical path for floating-point addition, in proceedings of AP-ASIC, pp.223–236, August 2000.; [3] A. Beaumont-smith, N. Burgess, S. Lefrere, and C. C. Lim, "Reduced latency IEEE floating-point standard adder architectures," In Proceedings of IEEE $14^{th}$ Symposium on Computer Arithmetic, April 1999.; [4] N. Quach and M. Flynn. "Design and implementation of the snap floating-point adder," Technical Report CSL-TR-91–501, Stanford University, December 1991.; and [5] Peter-M. Seider and G. Even, "How many logic levels does floating-point addition require?", "In Proceedings of IEEE $14^{th}$ Symposium on Computer Arithmetic", April 1999. According to the above-described researches, it is understood that the performance of the operator can be improved by performing the fourth stage of rounding prior to the third stage of normalization.

This means that the fourth stage of rounding is performed in the same pipeline as the second stage of addition, and in the following description, it is called a simultaneous rounding method (SRM).

In case of using such an SRM, a separate adder for rounding operation is not required, and re-normalization caused by an overflow during the general rounding operation is not produced, thereby improving the performance of the operator.

Especially, since the processing structure disclosed in the published documents [1], [2], and [3] is simple and has a greatly reduced complexity, it is efficient in hardware size and performance.

Now, the above-described rounding operation and the CR processes of a general floating-point adder and an SRM type floating-point adder will be explained one by one with reference to the accompanying drawings.

In case of the rounding operation, according to the IEEE standard, the floating-point number is classified into a single precision type composed of 32 bits and a double precision type composed of 64 bits in expression.

The single precision type is composed of a sign bit of one bit, exponent part of 8 bits, and fraction part of 23 bits. According ID to the normalized form of the fraction part, the most significant bit (MSB) is "1", and the MSB is omitted in the floating-point expression. This MSB is called a hidden bit.

Specifically, in the normalization process of the floating-point addition, the fraction part of one of two input floating-point numbers, whose exponent part is smaller than or equal to that of the other floating-point number, is shifted in the least significant bit (LSB) direction as much as the difference between the exponent parts of the two floating-point numbers, and at this time, for a proper round in the IEEE standard, information of the fraction part to be lost should be held.

For this, 3 bits, i.e., a guard (G) bit, round (R) bit, and sticky (Sy) bit are defined as proposed in D. Goldberg, "Computer arithmetic," Appendix A of J. L. Hennessy and D. A. Patterson, Computer architecture: a quantitative approach, MorganKaufmann publishers Inc, 1996.

At this time, the guard (G) bit has a weight value smaller than the LSB, and becomes the MSB of the fraction part to be lost. The round (R) bit becomes the next bit, and the sticky (Sy) bit becomes the value obtained by OR-gating all bits of the part to be lost except for the guard (G) bit and the round (R) bit.

In the above-described IEEE standard, four rounding types such as a round-to-nearest, round-to-zero, round-to-positive-infinity, and round-to-negative-infinity are provided.

Equation 1 represents a result of rounding for the respective rounding mode with the input of the LSB, Guard (G), round (R), and sticky (Sy) bits of the fraction part produced after passing through the alignment, addition, and normalization in the floating-point addition. Here, if the result of Equation 1 is "0", it means a round down of the rounding result, and if the result of Equation 1 is "1", it means a round up of the rounding result.

$$\text{Round}_{mode}(\text{LSB, G, R, Sy}) \qquad \text{[Equation 1]}$$

In more detail, in case of the round-to-nearest, if the guard (G) bit is "0", the round down is effected, while if the guard (G) bit is "1", and the round (R) bit or the sticky (Sy) bit is "1", the round up is effected. Also, if the guard bit is "1", the round bit and the sticky bit are "0", and the LSB is "1", the round up is effected, while otherwise, the round down is effected.

In case of the round-to-zero, the round down is effected.

In case of the round-to-positive-infinity, if the sign (S) bit is "0", and the guard (G) bit, round (R) bit, or sticky (Sy) bit is "1", the roundup is effected. Otherwise, the rounddown is effected.

In case of the round-to-negative-infinity, if the sign (S) bit is "1", and the guard (G) bit, round (R) bit, or sticky (Sy) bit is "1", the roundup is effected. Otherwise, the round down is effected.

The above-described four rounding types can be divided into three modes according to the sign, that is, the round-to-nearest, round-to-zero, and round-to-infinity. Hereinafter, it is considered that in Equation 1 represents the three mode.

Now, the process of the general floating-point adder will be explained in detail with reference to the accompanying drawings.

FIG. 1 is a view illustrating pipelines of a conventional floating-point adder.

Exponent parts of two input floating-point numbers are defined as Ea and Eb, and fraction parts thereof are defined as Ma and Mb, respectively.

At this time, since the exponent part is processed by a simple logic, only the process of the fraction part will be explained hereinafter.

Referring to FIG. 1, four pipelines are provided, and the operation performed at each pipeline stage is as follows.

The first stage is the alignment stage. A first format section 10 checks the format of two floating-point numbers. A swapper 20 compares the two floating-point numbers and transmits the fraction part of the number whose exponent part is smaller than or equal to that of the remaining number to the left, while it transmits the fraction part of the number whose exponent part is larger than or equal to that of the other number to the right. This operation is for alignment of the numbers in order.

Then, a right shifter 30 shifts right, i.e., in the LSB direction, the fraction part of the number whose exponent part is smaller than or equal to that of the remaining number as much as the difference between the two input exponent parts for alignment. At this time, during the shift for alignment, the sticky (Sy) bit is calculated through a sticky (Sy) bit generating section 31.

In case of addition, first and second bit-inverters 50 and 40 bypass their inputs, while in case of subtraction, they operate as inverters in accordance with control signals inverter-ctl1 and inverter-ctl2.

The second stage is the addition stage. A carry select adder (CSA) 60 adds the two fraction parts $S_3$ and $S_4$. This CSA 60 outputs a resultant value of addition and a value obtained by adding 1 to the resultant value of addition. A compound adder using an effective redundant carry chain is proposed in N. Quach and M. Flynn. "Design and implementation of the snap floating-point adder, Technical Report CSL-TR-91–501, Stanford University, December 1991. Also, a carry lookagead adder type CSA is proposed in A. Tyagi, A reduced-area scheme for carry-select adders, IEEE transactions on computers, vol. 42, no. 10, pp. 1163–1170, October 1993.

Then, the two values outputted from the CSA 60 are converted into a 1's complement value $S_5$ through a multiplexer 70 and a third bit-inverter 90.

The third stage is the normalization stage. A leading zero counter 110 calculates a leading zero with respect to an input number, and a left shifter 100 shifts in the MSB direction the number calculated at the second stage as much as the leading zero. Also, the left shifter 100 transmits the leading zero to an exponent subtraction section for performing an exponent subtraction.

A leading zero anticipatory logic that can calculate the leading zero at the second stage has been announced in E. Hokenek and R. Montoye, Leading-Zero Anticipator (LZA) in IBM RISK system/6000 floating-point execution unit, IBM journal of researches and developments, vol. 34, pp. 71–77, January 1990., and in H. Suzuki, H. Morinaka, H. Makino, Y. Nakase, and K. Mashiko, Leading-zero anticipatory logic for high-speed floating-point addition, IEEE journal of solid-state circuits, vol. 31, no. 8, pp. 1157–1164, August 1996. According to the present invention, the leading zero counter is selected for the convenience in explanation.

The fourth stage is the normalization stage. An incrementer 130 performs the rounding by performing an incremental operation. The output value of the incrementer 130 is shifted left by one bit for normalization, and a final result of operation is outputted from a second format section 150.

Next, the operation of an SRM floating-point adder will be explained.

FIG. 2 shows the conventional SRM type floating-point adder pipelines proposed in W. C. Park, S. W. Lee, O. Y. Kown, T. D. Han, and S. D. Kim, "Floating-point adder/subtracter performing IEEE rounding and addition and addition/subtraction in parallel," IEICE Trans. Information and Systems, vol. E79-d, no. 4, pp. 297–305, April 1996.

Referring to FIG. 2, the SRM type floating-point addition is performed in a manner that the first pipeline performs the alignment, the second pipeline performs the fraction part addition and rounding, and the third pipeline performs the normalization.

The most important feature of the SRM type in comparison to the general type floating-point addition is that the fraction part addition and the rounding are performed at one pipeline stage. In other words, since the rounding and the addition are performed with the addition of a simple logic, a separate high-speed adder for the rounding is not required.

Referring again to FIG. 2, the first stage is the alignment stage having the same processing type as that of the general floating-point adder.

The second stage is the stage of performing the addition and the rounding in parallel. At this stage, two fraction parts $S_3$ and $S_4$ inputted from the alignment stage are added together by a bit-half-adder 160, and as a result of addition, a sum and a carry are produced.

At this time, a carry select adder (CSA) receives $S_5$ and $S_6$ as its input. $S_5$ represents the sum outputted from the bit-half-adder, the MSB to the first bit of $S_6$ represent the carry, and the LSB of $S_6$ represents an output value of a predictor 180.

At this time, the predictor 180 outputs a variable participating in the rounding.

With the input of $S_5$ and $S_6$ as above, the CSA 170 outputs the resultant value of addition and the value obtained by increasing the resultant value by 1. That is, the CSA 170 outputs a value obtained by adding $S_3$, $S_4$, and the value from the predictor value, and a value obtained by increasing by 1 the added value.

And, an addition and rounding decision (ARD) section 190 generates a signal for selecting one of two values inputted to a multiplexer 200, of which the addition and the rounding have already been performed. The number selected by the multiplexer 200 according to the signal from the ARD section 190 is sent to the third pipeline through a bit-inverter 210.

Finally, the third stage is similar to the rounding stage processed by the general floating-point adder. The third stage decides an exponent increment value with reference to the MSB of S7, and includes a leading zero counter 240, a left shifter 220, and a second format section 230.

FIG. 3 illustrates the detailed construction of a portion of the first pipeline and the second pipeline of FIG. 2, and shows a hardware model that can perform the addition of the fraction part and the rounding in parallel.

Referring to FIG. 3, the construction comprises two n-bit exclusive-OR (XOR) operators 270 and 280, an alignment right shifter 250 for alignment, an n-bit half-adder 160, a predictor 180, a CSA 170 for addition of the fraction part, an n-bit multiplexer 200, an ARD 190, and a $q_0^{NS}$ 290.

The fraction part of one number whose exponent part is smaller than or equal to that of the other number of the two floating-point numbers is $S_1$, and the fraction part of the other number is $S_2$.

At this time, $S_1$ is inputted to the half-adder 160 through the shifter 250 for alignment, and $S_2$ is inputted to the half-adder 160 through the bit-XOR operator 270.

The bit-XOR operator 270 performs a bypass function when an externally inputted inverter_ctl1 is "0", and performs an inverter function when the inverter_ctl1 is "1".

The inverter_ctl1 is determined according to the comparison of relative values of two exponents of two input floating-point numbers and a signal representing either an addition or a subtraction operation.

The bit-half-adder 160 receives two n-bits, and output the carry and the sum. At this time, a vacancy exists in the LSB of the carry, and a result of calculation of the predictor 180 is inputted to this vacancy.

The predictor 180 is composed of a very simple logic. The predictor 180 performs the logical operation only for the round-to-infinity, and otherwise, it produces "0".

The function of the first and second adders 171 and 172 is implemented by one CSA 170, and two calculated values of the CSA 170 are inputted to the multiplexer 200.

The multiplexer 200 selects and outputs one of the two input numbers, of which the addition and the rounding have already been performed, in accordance with the control signal of the ARD 190.

As inputs for deciding the ARD 190 with respect to a given rounding mode exist a bit for representing whether the addition/subtraction is performed, carry bit of the first adder, MSB bit of the second adder, two bits of the first adder having the lowest precision, G, R, Sy, etc.

The ARD 190 outputs a final value through the logical operation with respect to the presented bits, and the $q_0^{NS}$ 290 serves to compensate for the LSB of the result of subtraction.

The hardware, i.e., the n-bit half-adder 160, predictor 180, and ARD 190, that is added to the existing floating-point adder to perform the addition of fraction and the rounding in the same pipeline is somewhat complicated in comparison to the existing floating-point adder, but does not affect the whole performance of the adder.

On the contrary, since the rounding can be performed in the same pipeline as the addition, a high-performance adder for the rounding operation and hardware for re-normalization are not required, and thus it is much more effective in comparison to the existing floating-point adder in performance and hardware size.

The CR operation of this floating-point adder will be explained.

According to the IEEE standard 754–1985, "IEEE standard for binary floating-point arithmetic," IEEE, 1985, the floating-point CR operation is briefly divided into conversion (itof) of an integer type number to a floating-point number, conversion (ftoi) of a floating-point number to an integer type number, and round operation (rnd) of a floating-point number.

As shown in FIG. 1, the exponent part of the number subject to the CR operation is sent to Ea, and the fraction part thereof is sent to Ma. Here, the typical floating-point adder requires a data path of 24 bits in case of the single precision type.

If it is assumed that the integer type number being processed is of 32 bits, an integer type number of 32 bits is outputted as a result of the ftoi conversion, and the 32-bit integer type number is inputted to the itof conversion. Thus, in FIG. 1, the data path of 32 bits is required for the conversion operation.

Now, referring to FIG. 1, the ftoi conversion operation of the floating-point number to the integer type number according to the general floating-point adder will be explained.

In FIG. 1, the first pipeline receives the exponent part Ea, and the adder for the exponent part calculates the shift amount and sends the calculated shift amount to the right shifter 30.

Ma is sent to the right shifter 30 through the first format section 10 and the swapper 20. This right shifter 30 shifts right for the shift amount with respect to the inputted fraction part. At this time, G, R, and Sy bits are produced.

Thereafter, if the floating-point number is negative, the first bit-inverter 50 performs the inversion operation. At this time, Mb becomes "0", and the second inverter 40 performs the bypass operation.

In the second pipeline, if the floating-point number is positive, the inputted number is transferred to the following stage. If the floating-point number is negative, its process becomes somewhat complicated.

It is assumed that the fraction part shifted in the first pipeline is A. This A is in the form of a sign-magnitude value, and the integer finally calculated after the rounding in the last pipeline is in the form of a 2's complement.

Accordingly, in case that the floating-point number is negative, the value after the rounding is made to be negative as the following Equation 2.

$$\begin{aligned}-(A+\text{Round}_{mode}(LSB, G, R, Sy)) &= \\ -A - \text{Round}_{mode}(LSB, G, R, Sy) &= \\ \overline{A} + 1 - \text{Round}_{mode}(LSB, G, R, Sy) &= \\ \overline{A} + \overline{\text{Round}_{mode}(LSB, G, R, SY)}&\end{aligned} \quad \text{[Equation 2]}$$

In implementing Equation 2, $\overline{A}$ inputted from the second pipeline is bypassed, and in case of the round down at the rounding stage, it is increased by 1, while in case of the round up, it is outputted as it is. The operation for inverting A is performed by the first bit-inverter 50.

Accordingly, in the second pipeline, the $S_3$ value is bypassed irrespective of its sign. For this, a 1's complement decision section 80 outputs "0", and the third bit-inverter 90 performs the bypass operation.

The third pipeline performs the bypass operation. In performing the bypass operation, the multiplexer 70 is provided to pass the input number without performing any work, or to properly process the input number.

For instance, if the result from the leading zero counter 110 is optionally made into "0", the input value passes through the third pipeline as it is without the left shift performed by the left shifter 100.

The fourth pipeline performs the rounding with the values of G, R, and Sy, and outputs the final value. At this time, if the input number is positive and the result of rounding is the round up, the input number is increased by 1, while if the result of rounding is the round down, no increment operation is performed. Meanwhile, if the input number is negative and the result of rounding is the round up, no increment operation is performed, while if the result of rounding is the round down, the increment operation is performed.

Next, the itof conversion operation of the integer type number to the floating-point number according to the general floating-point adder will be explained.

If the input number is positive, the first pipeline bypasses the number, while if the number is negative, it inverts the number. For this, the input number subject to the itof operation is sent to Ma, and Mb is adjusted to "0". If the input number is positive, the shift amount is adjusted to "0", and the first and second bit-inverters 50 and 40 perform the bypass operation. If the input number is negative, the first bit-inverter 50 serves as an inverter.

Unlike the ftoi operation, the G, R, and Sy bits are finally produced at the starting portion of the fourth pipeline.

Then, the second pipeline converts the input integer type number into a magnitude. That is, if the number is negative, it is changed to a 1's complement form. For this, if the input number is positive, the 1's complement decision section 80 outputs "1", while if the number is negative, it outputs "0". The third bit-inverter performs the bypass operation.

The third pipeline calculates the leading zero (LZ) of the input fraction part value. This LZ is used by the exponent part adder to decide the floating-point exponent part, and also used by the left shifter 100 to normalize the fraction part.

The fourth pipeline produces the G, R, and Sy using the lower 8 bits of the final 32-bit result, and outputs the final value by performing the rounding. Among the lower 8 bits, G represents the MSB value, R represents the following bit, and Sy represents the value obtained by performing the OR operation with respect to the lower 6 bits.

Next, the round (rnd) operation performed by the general floating-point adder will be explained.

The round operation with respect to the floating-point number is performed in a manner that the floating-point number is shifted as much as the position of the integer type number, and then returned to the floating-point number by performing the rounding operation.

If Ea is inputted to the first pipeline, its shift amount is calculated by the exponent part adder, and then Ea is sent to the right shifter 30. Also, Ma inputted to the first pipeline is sent to the right shifter 30 through the first format section 10 and the swapper 20. At this time, Mb is adjusted to "0".

The right shifter 30 shifts right the input fraction part as much as the shift amount. At this time, G, R, and Sy bits are produced.

Thereafter, the first and the second bit-inverters 50 and 40 perform the bypass operation irrespective of the sign, i.e., positive or negative, of the floating-point number.

The second pipeline performs the rounding operation using the characteristic of the carry selection adder (CSA) with the G, R, and Sy values produced in the first pipeline. For this, separate hardware is required.

If the rounding is performed in the fourth pipeline, the normalization process should be performed after the rounding operation. However, since the normalization process exists in the third pipeline, its implementation becomes complicated. Thus, it is efficient to perform the rounding in the second pipeline with the addition of somewhat hardware.

In the third pipeline, the leading zero counter 110 calculates the leading zero with respect to the input number, and the left shifter 100 shifts left the number as much as the leading zero to output the normalized floating-point number.

Finally, the fourth pipeline does not perform the rounding, and output the final value through the second format section 150.

However, according to the conventional SRM type floating-point addition as described above, it is difficult to provide the floating-point ALU operation due to its characteristic, and any research for solving this problem has not yet been published.

SUMMARY OF THE INVENTION

Accordingly, the present invention is directed to a floating-point ALU that substantially obviates one or more of the problems due to limitations and disadvantages of the related art.

An object of the present invention is to provide floating-point ALU that performs the IEEE rounding and the addition in parallel in an SRM type floating-point adder.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the apparatus for performing an IEEE rounding and addition in parallel for a floating-point arithmetic logical unit (ALU), comprising an alignment/normalization section for bypassing or inverting a first fraction part and a second fraction part, performing an alignment by performing a right shift as much as a value obtained from an exponent subtraction or performing a normalization through a left shift by calculating a leading zero with respect to the first fraction part, and obtaining a guard bit (G), round bit (R), and sticky bit (Sy), and an addition and rounding operation section for performing a addition and rounding with respect to the first and second fraction part outputted through the alignment/normalization section.

In another aspect of the present invention, there is provided a floating-point operator having an exponent alignment/normalization section, the operator comprising first and second bit-exclusive-OR (XOR) operators for bypassing or inverting two input values in accordance with first and second control signals externally inputted, a leading zero counter for calculating a leading zero using an output signal of the first bit-XOR operator, a multiplexer for selecting and outputting one of an output value of the leading zero counter and a shift amount for exponent alignment obtained through a separate exponent subtraction section, an alignment right rotator for performing the exponent alignment or normalization through right or left shifts using an output value of the multiplexer, and producing a guard bit (G), round bit (R), and sticky bit (Sy); and an addition and rounding section, the operator comprising a bit-half-adder for receiving the two bit streams outputted from the alignment right rotator and the second bit-XOR operator, and outputting a carry and a sum, a carry select adder (CSA) for outputting a resultant value of addition through the bit-half-adder and a value obtained by adding 1 to the resultant value of addition, a multiplexer for selecting and outputting one of two output values of the CSA in accordance with a fourth control signal externally inputted, and a correction section for correcting a least significant bit (LSB) of a result of subtraction with respect to an output value of the multiplexer.

Preferably, the first and second control signal are determined in accordance with the comparison of relative values of two exponents of two input floating-point numbers, the sign bits of input floating point numbers, and the signal representing one of operation among addition, subtraction, ftoi, itof, or rnd operation.

Preferably, the third control signal makes the shift amount outputted in case that the operation type is addition, subtraction, a ftoi conversion of a floating-point number to an integer type number, or a rounding, while it makes a modified leading zero value outputted in case that the operation type is an itof conversion of an integer type number to a floating-point number.

Preferably, the fourth control signal makes a final value determined through the logical operation of the sign bits of input floating point numbers, the signal representing one of operation among addition, subtraction, ftoi, itof, or rnd operation, a carry bit, most significant bit (MSB), two bits having the low accuracy, G, R, and Sy.

In still another aspect of the present invention, there is provided a method of performing an IEEE rounding and addition in parallel for a floating-point arithmetic logical unit (ALU), comprising an alignment/normalization step of performing an alignment by performing a right shift as much as a value obtained from an exponent part or performing a normalization through a left shift by calculating a leading zero, and obtaining a guard bit (G), round bit (R), and sticky bit (Sy) after bypassing or inverting a first fraction part, and performing bypassing or inverting a second fraction part, and an addition and rounding operation step of performing a floating-point addition and a rounding with respect to the first fraction part and the second fraction part outputted through the alignment/normalization section.

According to the present invention, since the addition and the rounding are performed in one pipeline, which is the advantage of the SRM method, it can support the CR operation method with respect to the SRM type floating-point addition performed through three pipeline stages.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the floating-point ALU according to the preferred embodiment of the present invention, examples of which are illustrated in the accompanying drawings.

Figure 4:
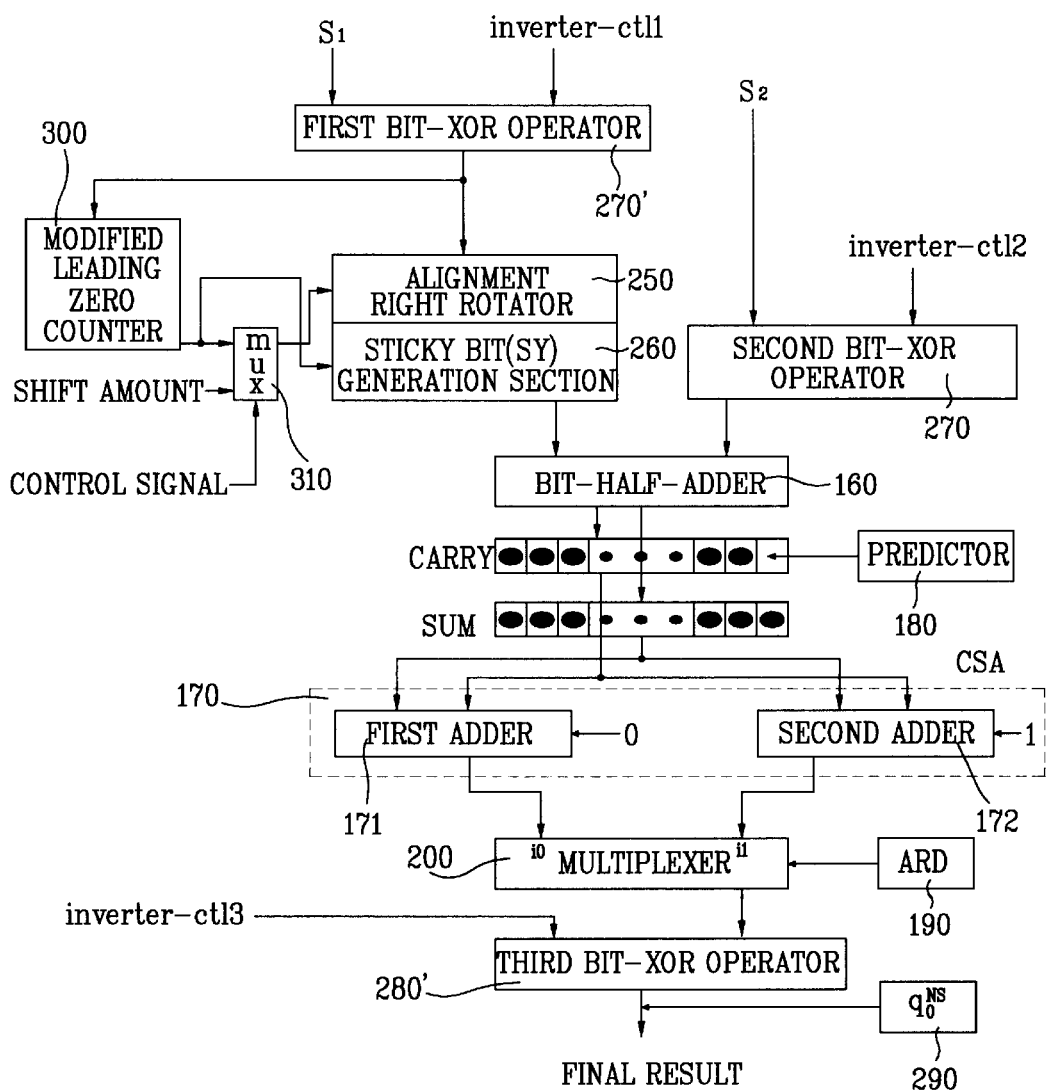
FIG. 4 is a view illustrating the construction of a floating-point adder according to the present invention.

FIG. 4 shows the construction of the SRM type floating-point ALU operator to which the CR operation is added according to the present invention. Three stages of exponent alignment/normalization, addition and rounding, and normalization are performed by the floating-point ALU.

Referring to FIG. 4, two inputs of the multiplexer (mux) 310 are a resultant value of a modified leading zero counter 300 and the shift amount calculated from the exponent part. The resultant value is outputted to an alignment right rotator 250. In accordance with the control signal, the multiplexer 310 outputs the shift amount in case of the ftoi conversion or the rounding, while it outputs the resultant value of the modified leading zero counter 300 in case of the itof conversion.

In implementing the CR in the SRM type operator, the point is to maintain the characteristic of the SRM type that performs the fraction part addition and the rounding in parallel.

In order to maintain the characteristic of the SRM type, it should be possible to produce the round down value during the rounding when the ARD 190 outputs "0", and to produce the round up value when the ARD 190 outputs "1".

Figure 3:
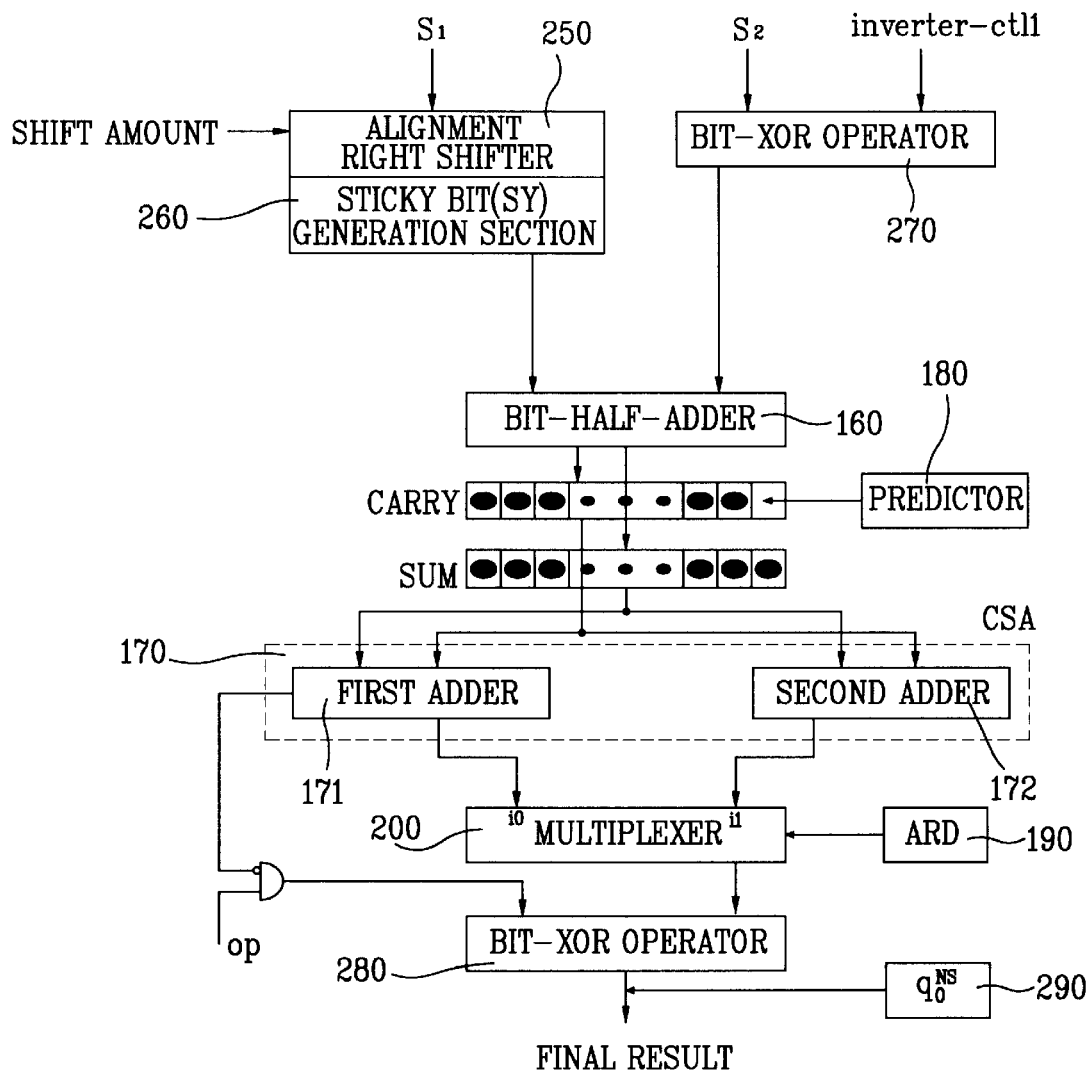
FIG. 3 is a view illustrating the conventional SRM type floating-point adder.

Referring to FIGS. 3 and 4, the SRM type floating-point CR operation, which is divided into the itof conversion of an integer type number to a floating-point number, ftoi conversion of a floating-point number to an integer type number, and round operation of a floating-point number, will be explained.

First, the ftoi conversion performed by the floating-point adder according to the present invention will be explained.

The pipeline process of the ftoi conversion is performed in the order of exponent alignment, fraction part addition, and rounding. Meanwhile, the SRM type process is performed in the order of exponent alignment, fraction part addition and rounding, and normalization.

In FIG. 4, if the fraction part of the input number is $S_1$, and the input number is positive, a first bit-XOR operator 270' performs the bypass operation to pass $S_1$ to the alignment right rotator 250.

The alignment right rotator 250 receives the shift amount calculated from the exponent part, and performs the right shifting. The result of the right shifting is defined as A.

At this time, if S2 is "0", the predictor 180 outputs "0", and invert-ctl2 and invert-ctl3 are "0" so that second and third bit-XOR operators 270 and 280' perform the bypass operation, the ARD 190 outputs "1" in case of the round up, and the final result becomes A+1. In case of the round down, the ARD 190 outputs "0", and the final result becomes A.

In FIG. 4, the final result is indicated as a result after rounding (RAR) as the resultant value of the fraction part after rounding.

Meanwhile, in case of the negative number, Equation 1 represents the resultant value of the fraction part after rounding. That is, in case of the round up, the resultant value of the fraction part RAR becomes $\overline{A}$, and in case of the round down, it becomes $\overline{A}+1$.

In order to produce this, the fraction part of the input number is inputted as S1, "0" as S2, "0" as inverter_ctl1, "1" as inverter_ctl2, and "1" as inverter_ctl3, respectively. As a result, all bits of the output value of the second bit-XOR operator 270 become "1", and thus the output becomes "−1".

The predictor 180 outputs a variable participating in the rounding. If it is assumed that the variable is "0", the final resultant value through the first adder 171 and the third bit-XOR operator 280' becomes $\overline{A-1+0}=(\overline{A}+1)$, and the final resultant value through the second adder 172 and the third bit-XOR operator 280' becomes $\overline{A-1+1}=\overline{A}$.

In consequence, in case of the round down, the ARD 190 selects the output value "i0" of the first adder 171, and in case of the round up, it selects the output value "i1" of the second adder 172, resulting in that the predictor 180 of the SRM and the ARD 190 are used as they are.

At this time, since the LSB from the first adder 171 is used as the input of the ARD 190, and the negative number has been inverted after the ftoi conversion, this value should be inverted again by the ARD 190.

Next, the process of the itof conversion performed by the floating-point adder according to the present invention will be explained.

The pipeline process of the itof conversion is performed in the order of fraction part addition for calculating the magnitude, normalization, and rounding. Meanwhile, in the SRM type process, information on the normalization should have already been known in order to perform the fraction part addition and the rounding in one pipeline.

According to the general floating-point addition, this information can be somewhat known. However, in case of the itof conversion, this information and the values of G, R, and Sy required for the rounding can be known after the normalization is actually performed, and this causes the support of the itof conversion in the SRM type to be most difficult.

In case that $S_1$ is positive, the itof conversion requires the sequential performance of the normalization and the rounding, but the SRM type requires the sequential performance of the rounding and the normalization.

The best way to solve this is that the SRM type exponent alignment section processes the normalization process. For this, the exponent alignment section employs the leading zero counter 300 and a bidirectional shifter.

Specifically, the leading zero counter 300 calculates the leading zero with respect to the input fraction part and the left shift should be executed to perform the normalization. However, in order to perform the exponent alignment that is the first stage of the floating-point adder, the right shift is required.

In order to satisfy both the two conditions, the bidirectional shifter is required. The leading zero counter 300 has a small hardware size and processing time, but the bidirectional shifter requires almost twice the hardware size in comparison to the unidirectional shifter. According to the present invention, the right rotator 250 is selected since it has a smaller burden in hardware than the bidirectional shifter.

The right rotator 250, with the addition of somewhat hardware, can perform the right shifting required for the exponent alignment, and the left shifting for the normalization required for the itof conversion.

Figure 5:
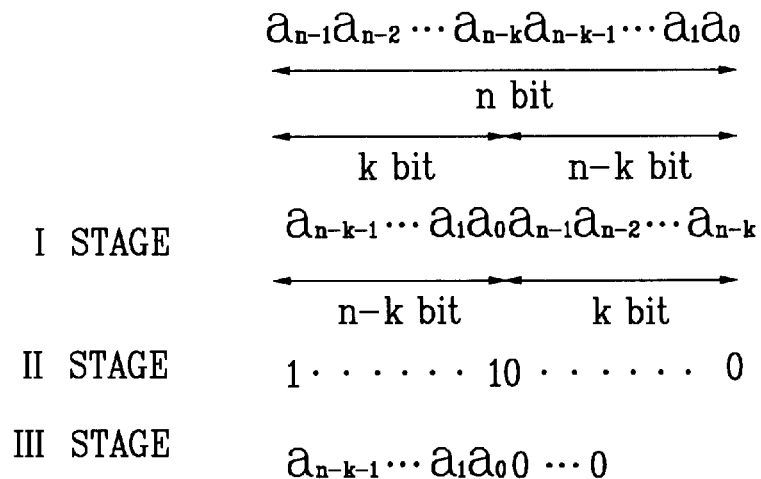
FIG. 5 is a view explaining a left shifting method according to the present invention.

The operation of the n-bit right rotator 250 that serves as a n-bit left shifter for k-bit left shifting is illustrated in FIG. 5.

Referring to FIG. 5, $a_{-1}a_{n-2} \ldots a_{n-k}a_{n-k-1} \ldots a_1a_0$ is indicated as the n-bit number. I stage performs a right rotation with respect to the n−k bit, and II stage produces a bit mask composed of an upper n−k bit of "1" and a lower k bit of "0".

Then, III stage performs an AND operation with respect to the two results to obtain a result of the k bit left shift. This can be easily implemented using an AND gate.

I and II stages can be performed in parallel, and since I stage is more complicated than II stage in performance, the addition of II stage does not affect the critical path.

In case that $S_1$ is positive, inverter ctl1 becomes "0", and $S_1$ value is inputted to the modified leading zero counter 300. The modified leading zero counter 300, which can be implemented by a slight modification of the leading zero counter for calculating k, calculates the n−k value shown in FIG. 5.

The output value of the modified leading zero counter 300 is inputted to the alignment right rotator 250, and is shifted left as shown in FIG. 5. At this time, G, R, and Sy for the rounding are produced. At this time, $S_2$ is determined to be "0", and inverter_ctl2 and inverter_ctl3 are determined also to be "0".

Accordingly, since the predictor 180 outputs "0", the first adder 171 outputs a value shifted left as much as the leading zero of the $S_1$ value, and the second adder 172 outputs a value that is larger by 1 than the output of the first adder 171.

As a result, in case of the round down, the ARD 190 selects "i0" that is the output value of the first adder 171, while in case of the round up, it selects "i1" that is the output value of the second adder 172. Thus, the SRM predictor 180 and the ARD 190 are used as they are.

In case that $S_1$ is negative, its process is somewhat complicated. That is, in case that $S_1$ is negative, it is required that $S_1$ is converted into the magnitude, and then its normalization is performed. For this, a high-speed incrementer having the size of the fraction part is required in the normalization stage. This method is not good since the processing time is lengthened and the hardware size is increased. Thus, in case that $S_1$ is negative, the method as shown in FIG. 6 is used.

Figure 6:
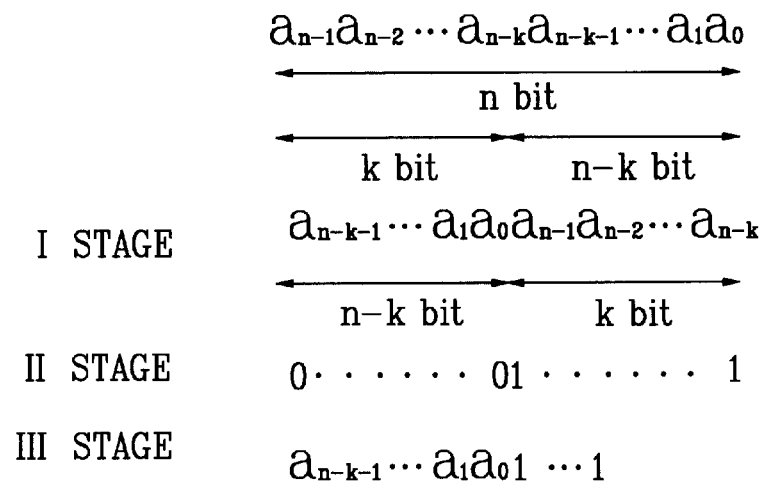
FIG. 6 is a view explaining another left shifting method according to the present invention.

The operation of the n-bit right rotator 250 serving as an n-bit left shifter for k-bit left shifting according to the present invention is shown in FIG. 6.

In the same manner as the method as shown in FIG. 5, I stage performs the right rotation with respect to the n−k bit, and II stage produces a bit mask composed of an upper n−k bit of "0" and a lower k bit of "1". Then, III stage performs an OR operation with respect to the two results to obtain a final result.

In case that $S_1$ is negative, the process of the construction of FIG. 4 will now explained.

First, the first bit-XOR operator 270' serves as an inverter to invert $S_1$. If it is assumed that the inverted $S_1$ is $a_{n-1}a_{n-2} \ldots a_1a_0$, the value passing through the alignment right rotator 250 becomes $a_{n-k}a_{n-k-1} \ldots a_1a_01 \ldots 1$.

At this time, "0" is inputted as inverter_ctl2, and "1" is inputted as $S_2$.

Accordingly, the output value of the second bit-XOR operator 270 becomes 000 . . . 01, and the numbers inputted to the bit-half-adder 160 that is the first part of the addition become $a_{n-k}a_{n-k-1} \ldots a_1a_01 \ldots 1$ and 000 . . . 01, resulting in that the magnitude of $S_1$ can be calculated.

Thus, since the predictor 180 outputs "0", the first adder 171 outputs a value shifted left as much as the leading zero of the magnitude of the $S_1$ value, and the second adder 172 outputs a value that is larger by 1 than the output of the first adder 171.

In case that S1 is positive, Sy becomes "0" if lower 6 bits of a bit mask result is "000000" as shown in FIG. 5, while otherwise, it becomes 1". This function can be easily implemented using an OR gate.

Meanwhile, in case that S1 is negative, Sy becomes "0" if the lower 6 bits of the bit mask result is "111111" as shown in FIG. 6, while otherwise, it becomes "1". This function can be easily implemented using an AND gate.

G and R bits can also be produced by addition of a simple logic.

As a result, the addition and the rounding can be performed in one pipeline stage using the existing predictor 180 and the ARD 190.

Next, the process of the round operation performed by the floating-point adder according to the present invention will be explained.

The pipeline for round operation requires the exponent alignment, rounding, and right shifting for normalization.

As described above, it is efficient that the rounding is performed in the second pipeline in the general floating-point addition, and this causes the hardware design to be complicated.

Meanwhile, since the SRM type requires the exponent alignment, addition and rounding, and normalization, it is similar to the pipeline process of the round operation. Thus, in this case, the implementation of the rounding becomes very easy.

Specifically, in FIG. 4, the fraction part of the input number is $S_1$, and the first bit-XOR operator 270' bypasses $S_1$ to the alignment right rotator 250.

This alignment right rotator 250 receives the shift amount calculated from the exponent part, and performs the right shifting. The result of the right shifting is defined as A.

At this time, it is determined that S2 is "0", the predictor 180 outputs "0", and invert-ctl2 and invert-ctl3 are "0" so that the second and third bit-XOR operators 270 and 280' perform the bypass operation. Thus, since the predictor 180 outputs "0", the first adder 171 outputs A, and the second adder 172 outputs A+1.

As a result, in case of the round down, the ARD 190 selects the output value "i0" of the first adder 171, and in case of the round up, it selects the output value "i1" of the second adder 172. Thus, the predictor 180 of the SRM and the ARD 190 are used as they are.

Figure 1:
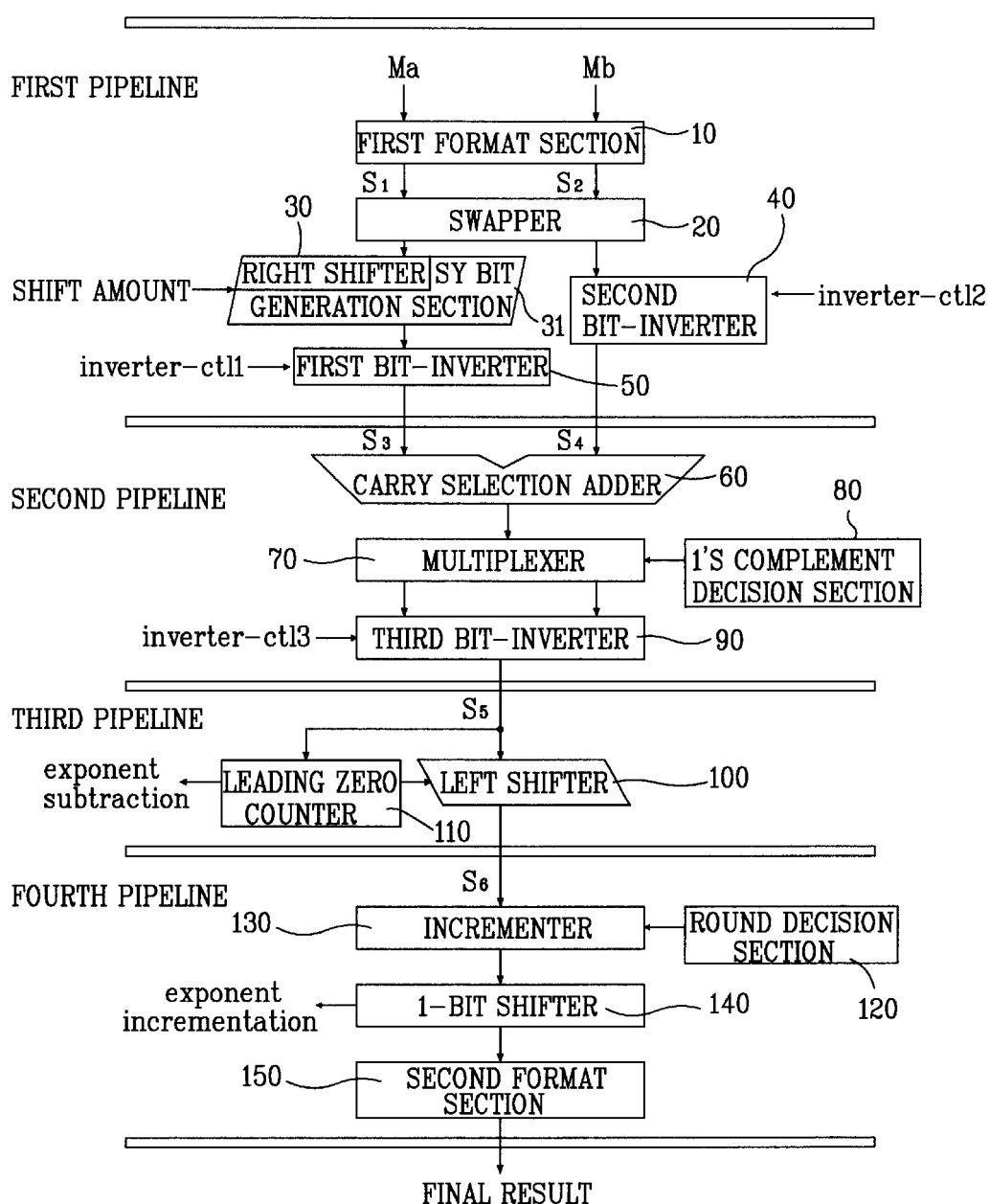
FIG. 1 is a view illustrating the conventional floating-point adder pipelines.
Figure 2:
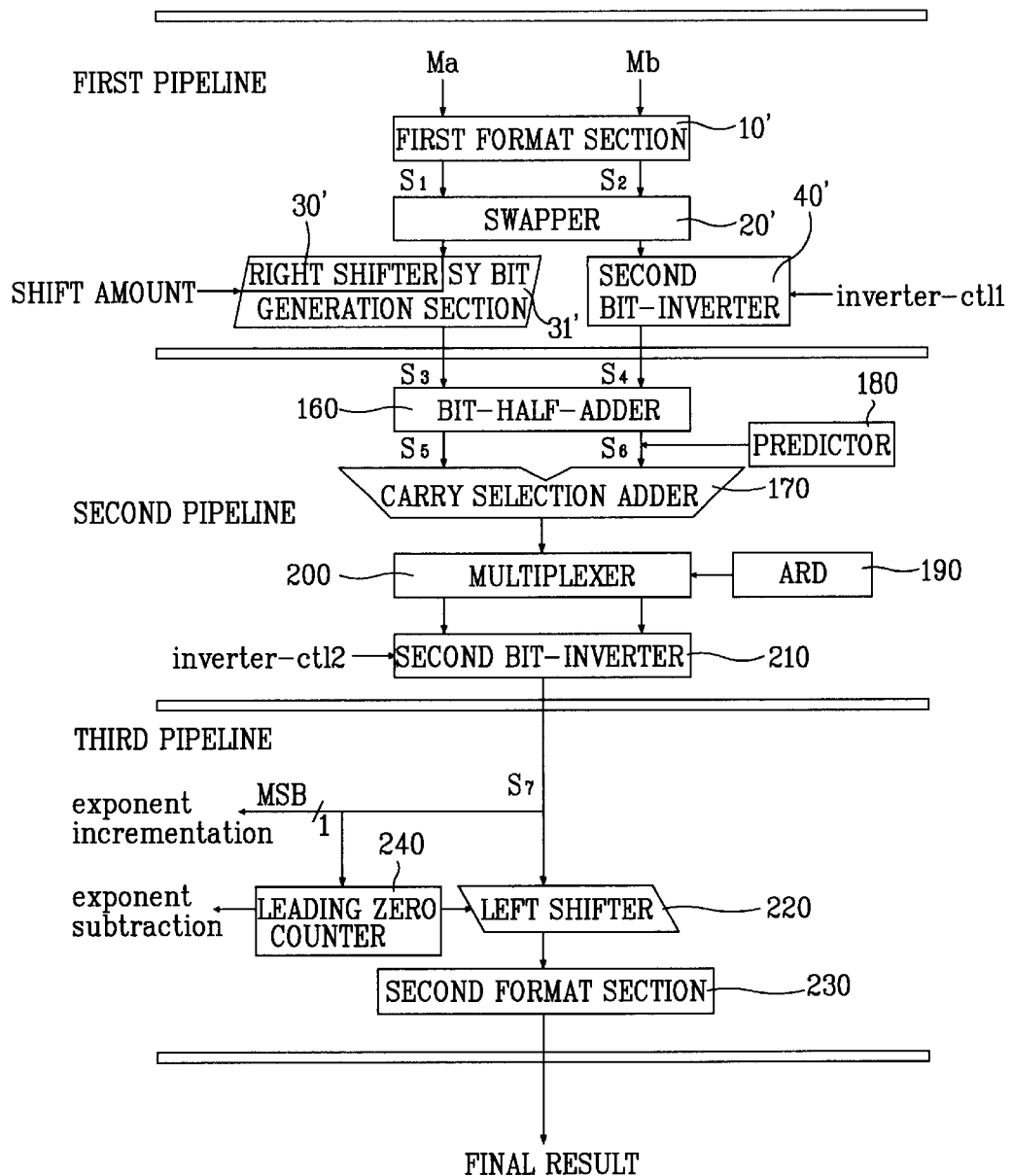
FIG. 2 is a view illustrating the conventional SRM type floating-point adder pipelines.

Accordingly, the construction of FIG. 4 outputs the result of the rounding operation after performing the normalization process as shown in FIG. 2 as the final result.

As described above, the present invention analyzes the conditions in order to provide the CR operation in the SRM type floating-point adder, and proposes a modified hardware structure with the addition of the CR operation to the existing SRM type hardware structure based on the result of analysis.

Also, for the easy explanation, though the floating-point number is limited to a single precision type of 32 bits and the integer type number is composed of 32 bits, the operation with respect to the double precision type floating-point number of 64 bits and the integer type number of 64 bits can also be easily implemented through a slight modification of the construction disclosed in the specification.

Also, since almost all the floating-point operators follow the IEEE standard 754–1985, "IEEE standard for binary floating-point arithmetic," IEEE, 1985, the present invention supports the four rounding modes of the IEEE standard.

Also, since the floating-point addition is divided into the fraction part process and the exponent part process, and the exponent part process can be implemented by a simple logic, the fraction part process is mainly described in the specification.

Also, the floating-point adder having the conversion and round function according to the present invention has been verified through simulation using a VHDL.

As described above, the floating-point ALU for performing the IEEE rounding and the addition in parallel according to the present invention has the following effects.

First, it performs the conversion operation through three-stage pipelines as it maintains the advantage of the SRM type, the processing time and the size of hardware can be reduced.

Second. It can use the hardware of the SRM as it is.

While the present invention has been described and illustrated herein with reference to the preferred embodiment thereof, it will be apparent to those skilled in the art that various modifications and variations can be made therein without departing from the spirit and scope of the invention.

What is claimed is:

1. An apparatus for performing an additional and a rounding operation in parallel for a floating-point arithmetic logical unit (ALU), comprising:

an alignment/normalization section for bypassing or inverting a first fraction part and a second fraction part, performing an alignment by performing a right shift as much as a value obtained from an exponent subtraction or performing a normalization through a left shift by calculating a leading zero with respect to the first fraction part, and obtaining a guard bit (G), round bit (R), and a sticky bit (Sy): and an additional and rounding operation section for performing a additional and rounding with respect to the first and second fraction part outputting through the alignment/normalization section.

2. An apparatus for performing an addition and a rounding operation in parallel for a floating-point arithmetic logical unit (ALU) having an exponent alignment/normalization section for either aligning exponents or normalization, an addition and rounding section for performing a fraction part addition and rounding, the apparatus comprising:

first and second bit-exclusion-OR (XOR) operators for bypassing or inverting two bit stream output values of the exponent alignment section in accordance with first and second control signals externally inputted;

a leading zero counter for calculating a leading zero using an output signal of the first bit-XOR operator;

a multiplexer for selecting and outputting on of an output value of the leading zero counter and a shift amount for exponent alignment obtained through a separate exponent part addition section;

an alignment right rotator for performing the exponent alignment or the normalization through right or left shifts using an output value of the multiplexer, and producing a guard bit (G), round bit (R), and sticky bit (Sy);

a bit-half-adder for receiving the two bit streams outputted from the alignment right rotator and the second bit-XOR operator, and outputting a carry and a sum;

a carry select adder (CA) for outputting a resultant value of addition through the bit-half-adder and a value obtained by adding 1 to the resultant value of addition;

a multiplexer for selecting and outputting one of two output values of the CSSA in accordance with a fourth control signal externally inputted; and a correction section for correcting a least significant bit (LSB) of a result of subtraction with respect to an output value of the multiplexer.

3. The apparatus as claimed in claim 2, wherein the first and second control signals are determined in accordance with relative values of two exponents of two input floating-point numbers and a signal representing on of operation among addition, subtraction, ftoi, itof, or rnd operation.

4. The apparatus as claimed in claim 2, wherein the third control signal makes the shift amount be outputted in case that the operation type is an addition, a subtraction, a ftoi conversion of a floating-point number to an integer type number, or the rounding, while it makes a modified leading zero value be outputted in case that the operation type of an itof conversion of integer type number to a floating-point number.

5. The apparatus as claimed in claim 2, wherein the fourth control signal makes a final value be determined through the logical operation of the sign bits of input floating point numbers, the signal representing one of operation among addition, subtraction, ftoi, itof, or rnd operation, a carry bit, most significant bit (MSB), two bits having the low accuracy, G, R, and Sy.

6. A method of performing an addition and a rounding operation in parallel for a floating-point arithmetic logical unit (ALU), comprising:

alignment/normalization step of performing an alignment by performing a right shift as much as a value obtained from an exponent part or performing a normalization through a left shift by calculating a leading zero, and obtaining a guard bit (G), round bit (R), and sticky bit (Sy) after bypassing or inverting a first fraction part and performing bypassing or inverting a second fraction part; and an addition and rounding operation step of performing a addition and rounding with respect to the first fraction part and the second fraction part outputted through the alignment/normalization step.

7. The method as claimed in claim 6, wherein if the first fraction part is positive, the exponent alignment/normalization step performs the normalization comprising:

a first step of performing a right rotation as much as a value n−k obtained by subtracting the number k of leading zeros from the total number n of bits;

a second step of producing a bit mask composed of a bit value of "1" given to an upper (n−k)-bit stream and a bit value of "0" give to a lower k-bit stream; and a third step of AND-operating the bit stream obtained at the first step and the bit mask obtained at the second step.

8. The method as claimed in claim 6, wherein if the first fraction part is negative, the exponent alignment/normalization step performs the normalization comprising:

a first step of performing a right rotation as much as a value n−k obtained by subtracting the number k of leading zeros from the total number n of bits:

a second step of producing a bit mask composed of a bit value of "0" given to an upper (n−k) bit stream and a bit value of "1" given to a lower k-bit stream; and a third step of OR-operating the bit stream obtained at the first step and the bit mask obtained at the second step.

* * * * *